United States Patent
Fu et al.

(10) Patent No.: US 12,045,450 B2
(45) Date of Patent: Jul. 23, 2024

(54) METHOD AND APPARATUS FOR ADJUSTING SIZES OF SPLIT-SCREEN WINDOWS

(71) Applicant: BEIJING XIAOMI MOBILE SOFTWARE CO., LTD., Beijing (CN)

(72) Inventors: Kaipeng Fu, Beijing (CN); Lu Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/970,358

(22) Filed: Oct. 20, 2022

(65) Prior Publication Data

US 2024/0036715 A1   Feb. 1, 2024

(30) Foreign Application Priority Data

Jul. 28, 2022   (CN) .......................... 202210900861.X

(51) Int. Cl.
G06F 3/04845 (2022.01)
G06F 3/0481 (2022.01)

(52) U.S. Cl.
CPC ........ *G06F 3/04845* (2013.01); *G06F 3/0481* (2013.01)

(58) Field of Classification Search
CPC .. G06F 3/04845; G06F 3/0484; G06F 3/0481; G06F 2203/04803
USPC ................................ 715/800, 788, 790, 792
See application file for complete search history.

(56) References Cited

U.S. PATENT DOCUMENTS

| | | | |
|---|---|---|---|
| 2007/0192726 A1* | 8/2007 | Kim | G09G 5/14 715/781 |
| 2010/0222902 A1* | 9/2010 | Eldridge | G05B 19/41845 700/86 |
| 2010/0241989 A1* | 9/2010 | Wen | G06F 3/0481 715/833 |

(Continued)

FOREIGN PATENT DOCUMENTS

| | | | |
|---|---|---|---|
| CN | 110650248 A | * | 1/2020 |
| CN | 114416227 A | * | 4/2022 |
| WO | WO 2022031049 A1 | | 2/2022 |

OTHER PUBLICATIONS

GoldSim Technology Group LLC, "User's Guide: GoldSim—Probabilistic Simulation Environment", Jun. 2018. (Year: 2018).*

(Continued)

*Primary Examiner* — Hwei-Min Lu
(74) *Attorney, Agent, or Firm* — Cozen O'Connor

(57) ABSTRACT

A method and an apparatus for adjusting sizes of split-screen windows including: detecting a first operation on a first display widget, in response to a first split-screen window and a second split-screen window for an application being displayed in a display area; displaying a second display widget, in response to the first operation being detected, wherein the second display widget comprises at least one icon and the at least one icon indicates a ratio of a size of the first split-screen window to a size of the second split-screen window; detecting a second operation on the at least one icon; and adjusting the size of the first split-screen window and the size of the second split-screen window based on the ratio indicated by the at least one icon, in response to the second operation being detected.

13 Claims, 7 Drawing Sheets

(56) References Cited

U.S. PATENT DOCUMENTS

| | | | |
|---|---|---|---|
| 2014/0026099 A1* | 1/2014 | Andersson Reimer | ...................... G06F 3/0482 715/825 |
| 2014/0189575 A1* | 7/2014 | Shuttleworth | ........ G06F 3/0481 715/781 |
| 2015/0074589 A1* | 3/2015 | Pan | ..................... G06F 3/04886 715/781 |
| 2016/0077794 A1* | 3/2016 | Kim | ........................ G10L 15/20 704/275 |
| 2016/0364122 A1* | 12/2016 | Shimomura | ........... G06F 3/0481 |
| 2017/0168628 A1* | 6/2017 | Yin | ........................ G06F 3/0481 |
| 2017/0357437 A1* | 12/2017 | Peterson | ............... G06F 40/134 |
| 2019/0108724 A1* | 4/2019 | Bergant | ............... G07F 17/3288 |
| 2021/0096704 A1* | 4/2021 | Ericsson | ............... G06F 3/0483 |
| 2022/0357845 A1* | 11/2022 | Luo | ........................ G06F 3/0486 |

OTHER PUBLICATIONS

European Patent Application No. 22204669.0, Search and Opinion dated Jul. 18, 2023, 9 pages.

\* cited by examiner

METHOD AND APPARATUS FOR ADJUSTING SIZES OF SPLIT-SCREEN WINDOWS

CROSS-REFERENCE TO RELATED APPLICATIONS

This application is based on and claims priority to the Chinese Patent Application No. 202210900861.X, filed on Jul. 28, 2022, the entire content of which is incorporated herein by reference.

TECHNICAL FIELD

The present disclosure relates generally to the technical field of terminals and in particular, relates to a method and an apparatus for adjusting sizes of split-screen windows, an electronic device and a storage medium.

BACKGROUND

With the continuous development of electronic information technology, the performance of electronic devices has been significantly improved. In order to improve the visual experience of users, screen sizes of the electronic devices are also set to be larger, and the demand for split-screen display of the electronic devices is increasing. For example, in a multi-application split-screen display scenario, a fixed split-screen mode is usually adopted, for example, a screen display area of the electronic device is displayed in two equal parts.

SUMMARY

A method for adjusting sizes of split-screen windows, applied to an electronic device, including: detecting a first operation on a first display widget, in response to a first split-screen window and a second split-screen window for a predetermined application being displayed in a display area; displaying a second display widget, in response to the first operation being detected, wherein the second display widget comprises at least one icon and the at least one icon indicates a ratio of a size of the first split-screen window to a size of the second split-screen window; detecting a second operation on the at least one icon; and adjusting the size of the first split-screen window and the size of the second split-screen window based on the ratio indicated by the at least one icon, in response to the second operation being detected.

An electronic device, comprising: a processor; and a memory for storing instructions executable by the processor; wherein the processor is configured to: detecting a first operation on a first display widget, in response to a first split-screen window and a second split-screen window for a predetermined application being displayed in a display area; displaying a second display widget, in response to the first operation being detected, wherein the second display widget comprises at least one icon and the at least one icon indicates a ratio of a size of the first split-screen window to a size of the second split-screen window; detecting a second operation on the at least one icon; and adjusting the size of the first split-screen window and the size of the second split-screen window based on the ratio indicated by the at least one icon, in response to the second operation being detected.

A non-transitory computer-readable storage medium having stored therein instructions that, when executed by a processor of a mobile terminal, causes the mobile terminal to perform a method for adjusting sizes of split-screen windows as mentioned above.

BRIEF DESCRIPTION OF THE DRAWINGS

The drawings herein are incorporated into the specification and constitute a part of the specification, show embodiments in conformity with the present disclosure, and explain the principle of the present disclosure together with the specification.

DETAILED DESCRIPTION

The example embodiments will be described in detail here, and examples thereof are shown in the accompanying drawings. When the accompanying drawings are referred to in the following descriptions, unless otherwise indicated, the same numbers in different drawings represent the same or similar elements. The implementations described in the following illustrative embodiments do not represent all implementations consistent with the disclosure. Rather, they are merely examples of apparatuses and methods consistent with some aspects of the present disclosure as detailed in the appended claims.

In order to facilitate the understanding of those skilled in the art, multiple implementations are enumerated in the embodiments of the present disclosure to clearly explain the technical solution of the embodiments of the present disclosure. Those skilled in the art can understand that multiple embodiments provided by the present disclosure can be executed individually or in combination with the methods of other embodiments in the present disclosure, or individually or in combination with some of the methods in other relevant techniques, which is not limited in the embodiments of the present disclosure.

In order to better understand the embodiments of the present disclosure, application scenarios of split-screen are explained as follows.

In one embodiment, the system (e.g., Android system) natively only supports split-screen between different applications, and sizes of left and right split-screen windows may be adjusted, but there is no solution for adjusting the sizes of the left and right windows for split-screen of multiple windows within a single application. In the related technologies, with wide application of multi-device, an expansion screen, a folding screen, a tablet device, etc., multiple split-screen windows displaying the single application will become a main form of three-party applications, and the method for adjusting the sizes of split-screen windows with a shortcut menu will become a core usage scenario.

Figure 1:
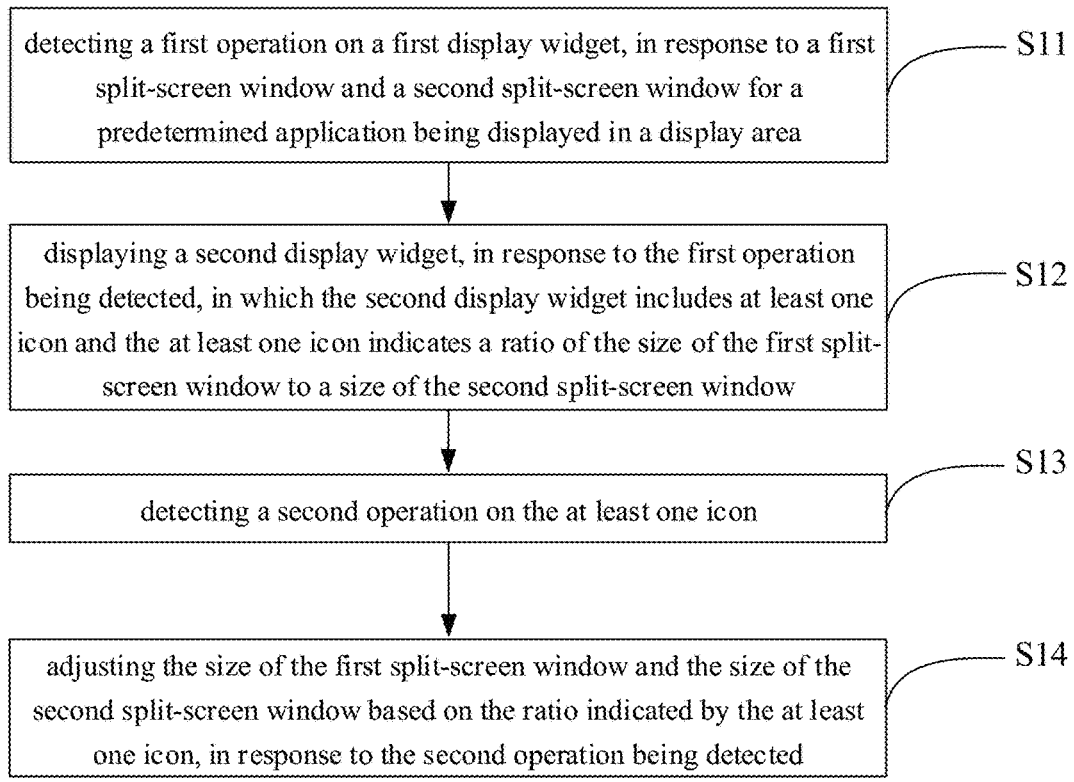
FIG. 1 is a schematic flowchart illustrating a method for adjusting sizes of split-screen windows according to an example embodiment.

As illustrated in FIG. 1, an embodiment of the present disclosure provides a method for adjusting sizes of split-screen windows applied to an electronic device, and the method includes the following.

At S11, a first operation on a first display widget is detected, in response to a first split-screen window and a second split-screen window for a predetermined application being displayed in a display area.

At S12, a second display widget is displayed, in response to the first operation being detected, in which the second display widget includes at least one icon and the at least one icon indicates a ratio of a size of the first split-screen window to a size of the second split-screen window.

At S13, a second operation on the at least one icon is detected.

At S14, the size of the first split-screen window and the size of the second split-screen window are adjusted based on the ratio indicated by the at least one icon, in response to the second operation being detected.

The electronic device involved in the present disclosure may be, but is not limited to, a mobile phone, a wearable device, a vehicle-mounted terminal, a road side unit (RSU), a smart home terminal, an industrial sensing device and/or a medical device, etc. In some embodiments, the terminal may be a Redcap terminal or a new air interface NR terminal of a predetermined version (e.g., an NR terminal of R17). For example, the electronic device may be a large screen device such as a tablet device, an expansion screen device or a folding screen device.

It should be noted that the predetermined application is a single application run on the electronic device. For example, the predetermined application may be a search engine software, a chat software or a collaborative office software run on the electronic device.

In one embodiment, after the single application software is started, the first split-screen window is displayed in a first display area on the display screen of the electronic device, and the second split-screen window is displayed in a second display area on the display screen of the electronic device. Here, the first display area and the second display area may occupy an entire or partial display area of the electronic device. Here, the area of the first split-screen window and the second split-screen window may be same or different, and the sizes of the first split-screen window and the second split-screen window may be determined based on the content to be displayed in each window.

In one embodiment, the first split-screen window and the second split-screen window are respectively configured to display different contents. For example, the first split-screen window is configured to display list content (e.g., operation options), and the second split-screen window is configured to display operation information content (specific operation information) corresponding to the list content.

In one embodiment, the first split-screen window and the second split-screen window are displayed according to pre-configuration information, when a predetermined application is started. For example, if the pre-configuration information indicates that the configuration windows are configured in a left-right layout, the first split-screen window and the second split-screen window are displayed in a left-right layout. Alternatively, if the pre-configuration information indicates that the configuration windows are configured in a top-bottom layout, the first split-screen window and the second split-screen window are displayed in a top-bottom layout. It should be noted that the layout forms of the first split-screen window and the second split-screen window may be flexible and diverse, and are not limited to the above two layout forms, which are not limited here. Here, the layout of the windows may correspond to a split-screen mode.

The operations (e.g., the first operation and the second operation) involved in the present disclosure may be touch operations on display widgets on a touch screen of the electronic device, and the touch operations may be click or slide operations. In a specific scenario, the operations may also be a sensing operation for the display widgets on a touch screen of the electronic device, such as a voice recognition and a gesture recognition, which is not limited herein.

The at least one icon involved in the present disclosure may be a text icon, for example, an icon with text on the at least one icon; it may also be an image icon, for example, an icon with image content on the at least one icon.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. The first operation is detected, in response to determining that a duration of an operation on the first display widget is greater than a duration threshold. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. The first display widget is displayed between the display area of the first split-screen window and the display area of the second split-screen window. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected.

Figure 2:
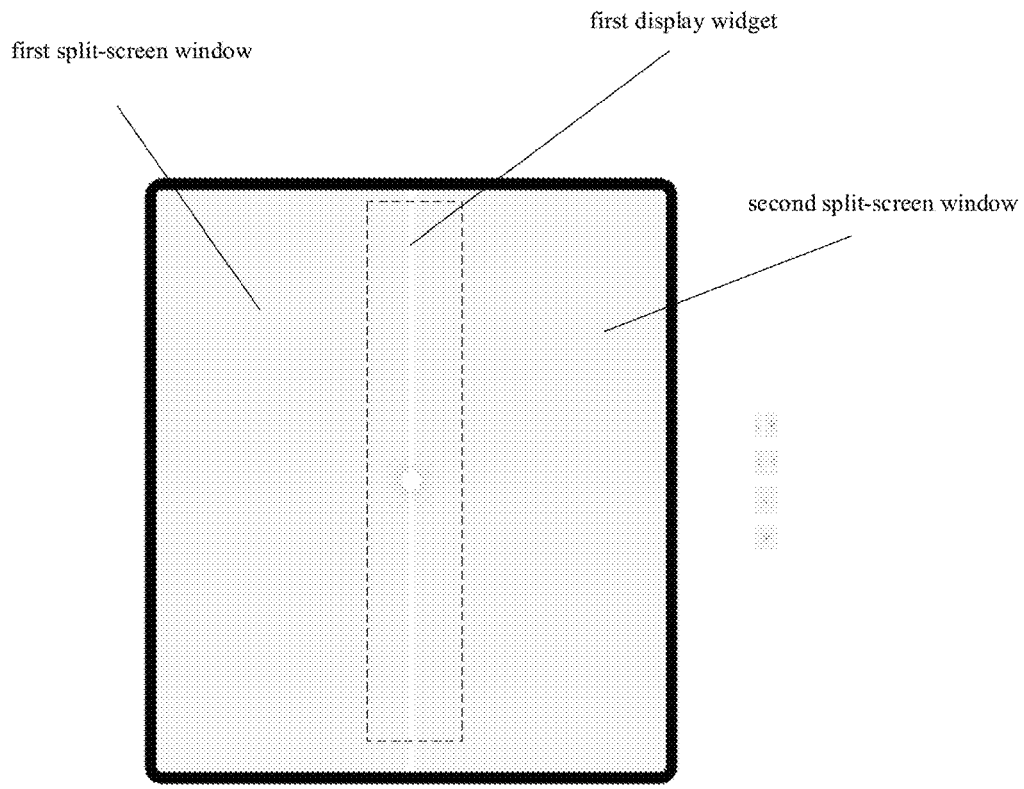
FIG. 2 is a schematic diagram illustrating a split-screen display according to an example embodiment.

It should be noted that, referring to FIG. 2, the first display widget may be a long strip display widget, the corresponding display area of the first display widget is a long strip display area, and the long strip may be a rectangle, an ellipse, or the like. For example, the display area of the first display widget may be an interval (e.g., gap) area between the display area of the first split-screen window and the display area of the second split-screen window. In one embodiment, if a touch operation is detected in the interval (gap) area between the display area of the first split-screen window and the display area of the second split-screen window, it is determined that the first operation is detected. For example, if the touch operation with a duration greater than the duration threshold is detected in the interval (gap) area between the display area of the first split-screen window and the display area of the second split-screen window, it is determined that the first operation is detected.

In some embodiments, if the first split-screen window and the second split-screen window are displayed in a left-right layout, the first display widget is a vertical strip display widget. Alternatively, if the first split-screen window and the second split-screen window are displayed in a top-bottom layout, the first display widget is a horizontal display widget.

In one embodiment, the duration threshold may be determined based on the mistouch rate of a display screen of the electronic device. For example, the duration threshold is less than a predetermined value in response to the mistouch rate being less than a mistouch rate threshold. Alternatively, the duration threshold is greater than a predetermined value, in response to the mistouch rate being greater than the mistouch rate threshold. It should be noted that "greater than" in the disclosure has the meaning of "greater than or equal to" in some scenarios, and "less than" in the disclosure has the meaning of "less than or equal to" in some scenarios.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. The first display widget is displayed on an edge of the display area of the first split-screen window and/or an edge of the display area of the second split-screen window. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected.

In some embodiments, the first split-screen window and the second split-screen window are displayed in a left-right layout. The first display widget may be displayed on a top of the first split-screen window or the second split-screen window, or on a bottom of the first split-screen window or the second split-screen window, or on the top or bottom of the first split-screen window and the second split-screen window. Alternatively, the first display widget may be displayed on a left side of the first split-screen window or on a right side of the second split-screen window. It should be noted that the top or the bottom of the first split-screen window may be an edge display area of the electronic device. The left side of the first split-screen window and the right side of the second split-screen window may also be an edge display area of the electronic device. Correspondingly, the first operation may be an operation on the edge display area of the electronic device.

In some embodiments, the first split-screen window and the second split-screen window are displayed in a top-bottom layout. The first display widget may be displayed on a top of the first split-screen window or on a bottom of the second split-screen window. Alternatively, the first display widget may be displayed on a left side or a right side of the first split-screen window, or on a left side or a right side of the second split-screen window. It should be noted that the top of the first split-screen window or the bottom of the second split-screen window may be an edge display area of the electronic device. The left side or the right side of the first split-screen window may also be an edge display area of the electronic device. The left side or the right side of the second split-screen window may also be an edge display area of the electronic device. Correspondingly, the first operation may be an operation on the edge display area of the electronic device.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. A second display widget is displayed, in response to the first operation being detected. The second display widget is displayed between the display area of the first split-screen window and the display area of the second split-screen window. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. A second display widget is displayed, in response to the first operation being detected. The second display widget is displayed on an edge of the display area of the first split-screen window and/or an edge of the display area of the second split-screen window. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected.

In one embodiment, the second display widget may be displayed in the display area where the first display widget is located. For example, referring to FIG. 3, the second display widget may be displayed on a top of the first display widget. It should be understood that the display area where the first display widget is located may be completely or partially superposed with the display area where the second display widget is located.

In one embodiment, the first display widget is displayed in an edge display area of the electronic device, and the second display widget may be displayed on a top of the first display widget. Here, since the second display widget is displayed in the edge display area of the electronic device, it is convenient for users to operate the second display widget with their thumbs to improve the users' experience.

Figure 3:
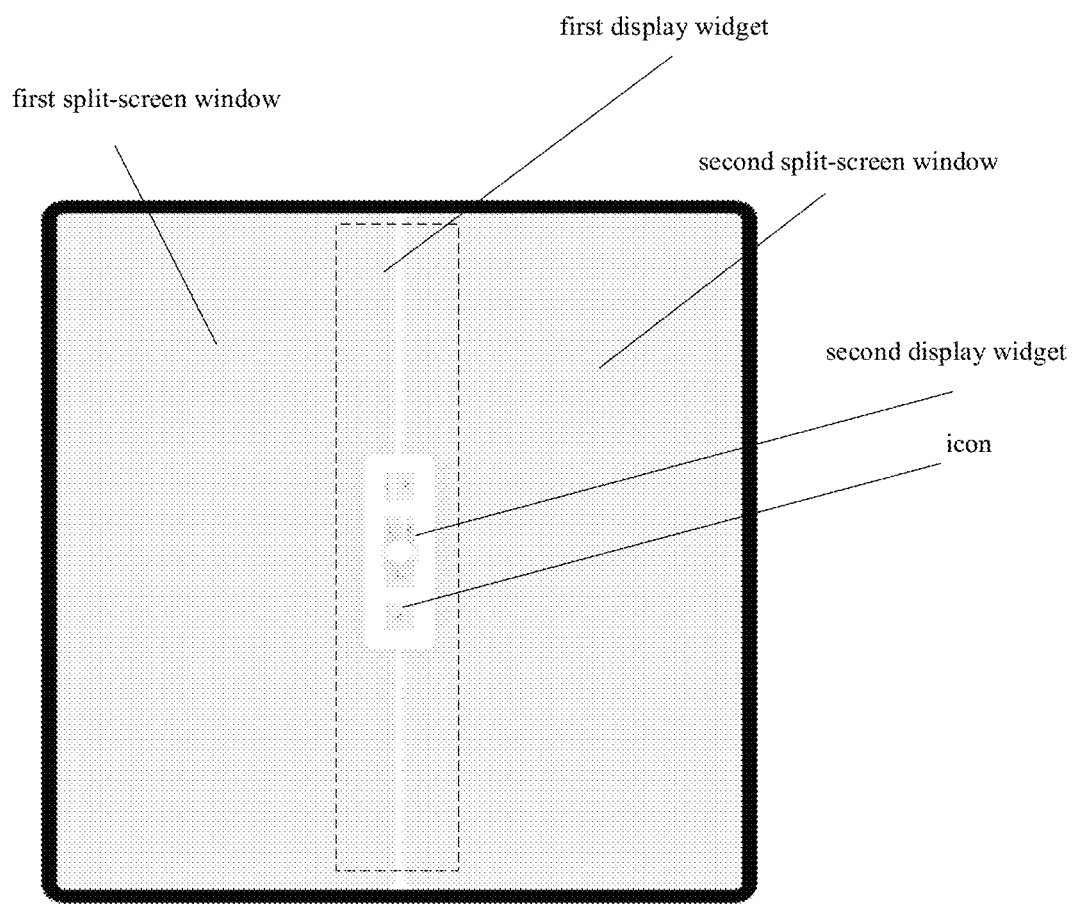
FIG. 3 is a schematic diagram illustrating a split-screen display according to another example embodiment.
Figure 4:
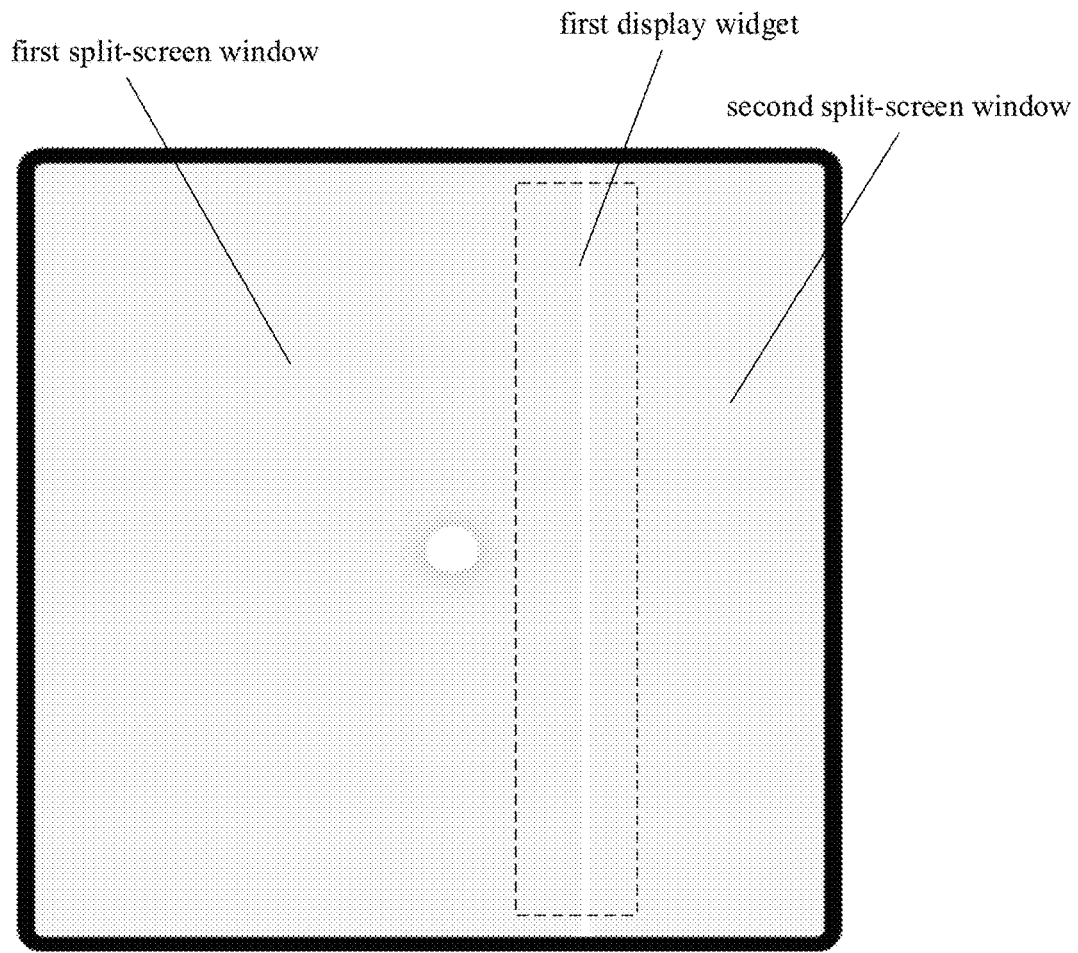
FIG. 4 is a schematic diagram illustrating a split-screen display according to another example embodiment.

In one embodiment, referring to FIG. 3 again, the second display widget includes at least one icon, which graphically shows a ratio of the size of the first split-screen window to the size of the second split-screen window. For example, FIG. 3 shows four icons, i.e. a first icon, a second icon, a third icon and a fourth icon, and the ratio of the first split-screen window on the left and the second split-screen window on the right for the four icons are 1:3, 3:1, 4:0 and 0:4 respectively. For example, referring to FIG. 4, if a second operation on the second icon is detected, the window distribution after the size of the first split-screen window and the size of the second split-screen window are adjusted based on the ratio indicated by the second icon is shown in FIG. 4. It should be noted that the first split-screen window and the second split-screen window may be displayed in a ratio of 1:1 when the predetermined application is started.

For example, when the predetermined application is in a mode of multi-window left-right split-screen, the first split-screen window on the left side is configured to display a list, and the second split-screen window on the right side is configured to display a detailed content. At the initial startup, the first split-screen window and the second split-screen window each occupies half of a display screen. If a user wants the first split-screen window to display more content, the user may trigger a display shortcut menu (corresponding to the second display widget) by long pressing a gap area (corresponding to the first display widget) between the first split-screen window and the second split-screen window. An icon indicating the ratio of the size of the first split-screen window and the size of the second split-screen window (an icon indicating the desired ratio) is then selected to implement size adjustment of the display areas of the first split-screen window and the second split-screen window.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected. A third operation on a predetermined area of the first split-screen window or the second split-screen window is detected, in which the third operation is a sliding operation in a predetermined direction. The size of the first split-screen window and the size of the second-screen window is adjusted based on sliding amplitude and/or the predetermined direction of the third operation, in response to determining that the third operation is detected.

Here, the predetermined area may be any area in a top, bottom, left or right area of the first split-screen window or the second split-screen window. For example, referring to FIG. 4, the predetermined area is the bottom area. The predetermined direction may be any direction, for example, an upward or downward direction.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected. A third operation on a predetermined area of the first split-screen window or the second split-screen window is detected, in which the third operation is a sliding operation in a predetermined direction. An equivalent sliding distance is determined based on the sliding amplitude and the predetermined direction, in response to the third operation being detected. The size of the first split-screen window and the size of the second split-screen window are adjusted based on the equivalent sliding distance.

For example, when the predetermined application is in a mode of multi-window left-right split-screen, the first split-screen window on the left is configured to display a list, and the second split-screen window on the right is configured to display a detailed content. In initial setting, the first split-screen window and the second split-screen window each occupies half of a display area of the electronic device. If a user wants the first split-screen window to display more content, the user may trigger the adjustment of the size of the first split-screen window and the size of the second split-screen window by touching a bottom area of the second split-screen window with a gesture. For example, by sliding upward, a display size of the first split-screen window is increased, and a display size of the second split-screen window is reduced.

Similarly, if the user wants the second split-screen window to display more content, the user may trigger the adjustment of the size of the first split-screen window and the size of the second split-screen window by touching a bottom area of the first split-screen window with a gesture. For example, by sliding upward, the display size of the second split-screen window is increased, and the display size of the first split-screen window is reduced.

In the embodiment of the present disclosure, the first operation on the first display widget is detected, in response to the first split-screen window and the second split-screen window for the predetermined application being displayed in the display area; the second display widget is displayed, in response to the first operation being detected, the second display widget includes at least one icon and the at least one icon indicates the ratio of the size of the first split-screen window to the size of the second split-screen window; the second operation on the at least one icon is detected; and the size of the first split-screen window and the size of the second split-screen window are adjusted based on the ratio indicated by the at least one icon, in response to the second operation being detected. Here, for the first split-screen window and the second split-screen window for a single predetermined application, after detecting the first operation on the first display widget, the second display widget may be displayed. Moreover, in response to the second operation on the at least one icon, the size of the first split-screen window and the size of the second split-screen window may be adjusted based on the ratio indicated by the at least one icon. Compared with the method in the related art that can only adjust sizes of windows for different applications, in the embodiments of the present disclosure, the size of different split-screen windows for the same application may be adjusted, which may better adapt to the users' adjustment requirements for sizes of different split-screen windows for a single application and improve user experience.

It should be noted that those skilled in the art can understand that the methods provided in the embodiments of the present disclosure can be implemented separately or together with some methods in the embodiments of the present disclosure or related technologies.

Figure 5:
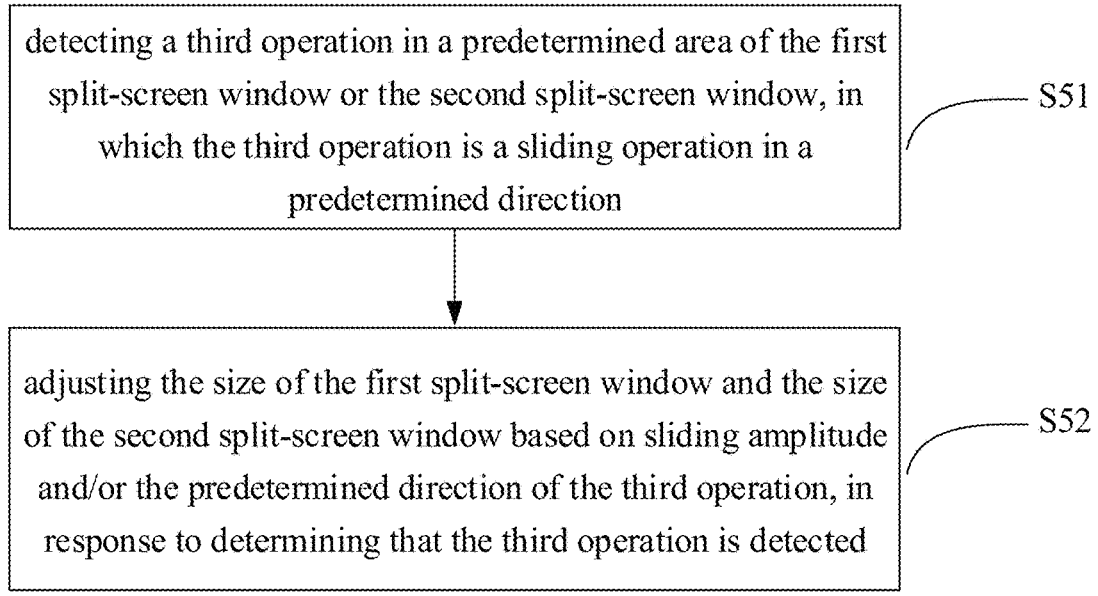
FIG. 5 is a schematic flowchart illustrating a method for adjusting sizes of split-screen windows according to an example embodiment.

As illustrated in FIG. 5, an embodiment of the present disclosure provides a method for adjusting sizes of split-screen windows applied to an electronic device, and the method includes the following.

At S51, a third operation in a predetermined area of the first split-screen window or the second split-screen window is detected, in which the third operation is a sliding operation in a predetermined direction.

At S52, the size of the first split-screen window and the size of the second split-screen window are adjusted based on sliding amplitude and/or the predetermined direction of the third operation, in response to determining that the third operation is detected.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected. A third operation on a predetermined area of the first split-screen window or the second split-screen window is detected, in which the third operation is a sliding operation in a predetermined direction. The size of the first split-screen window and the size of the second-screen window are adjusted based on sliding amplitude and/or the predetermined direction of the third operation, in response to determining that the third operation is detected.

Here, the predetermined area may be any area in a top, bottom, left or right area of the first split-screen window or the second split-screen window. For example, referring to FIG. 4, the predetermined area is the bottom area. The predetermined direction may be any direction, for example, an upward or downward direction.

In an embodiment of the present disclosure, a predetermined application is started, and a first split-screen window and a second split-screen window for the predetermined application are displayed in a display area. A first operation on a first display widget is detected, in response to the first split-screen window and the second split-screen window being displayed in the display area. A second display widget is displayed, in response to the first operation being detected. The second display widget includes at least one icon. The at least one icon indicates a ratio of a size of the first split-screen window to a size of the second split-screen window. A second operation on the at least one icon is detected. The size of the first split-screen window and the size of the second split-screen window are adjusted based on the ratio indicated by the at least one icon, in response to the second operation being detected. A third operation on a predetermined area of the first split-screen window or the second split-screen window is detected, in which the third operation is a sliding operation in a predetermined direction. An equivalent sliding distance is determined based on the sliding amplitude and the predetermined direction, in response to the third operation being detected. The size of the first split-screen window and the size of the second screen window are adjusted based on the equivalent sliding distance.

Figure 6:
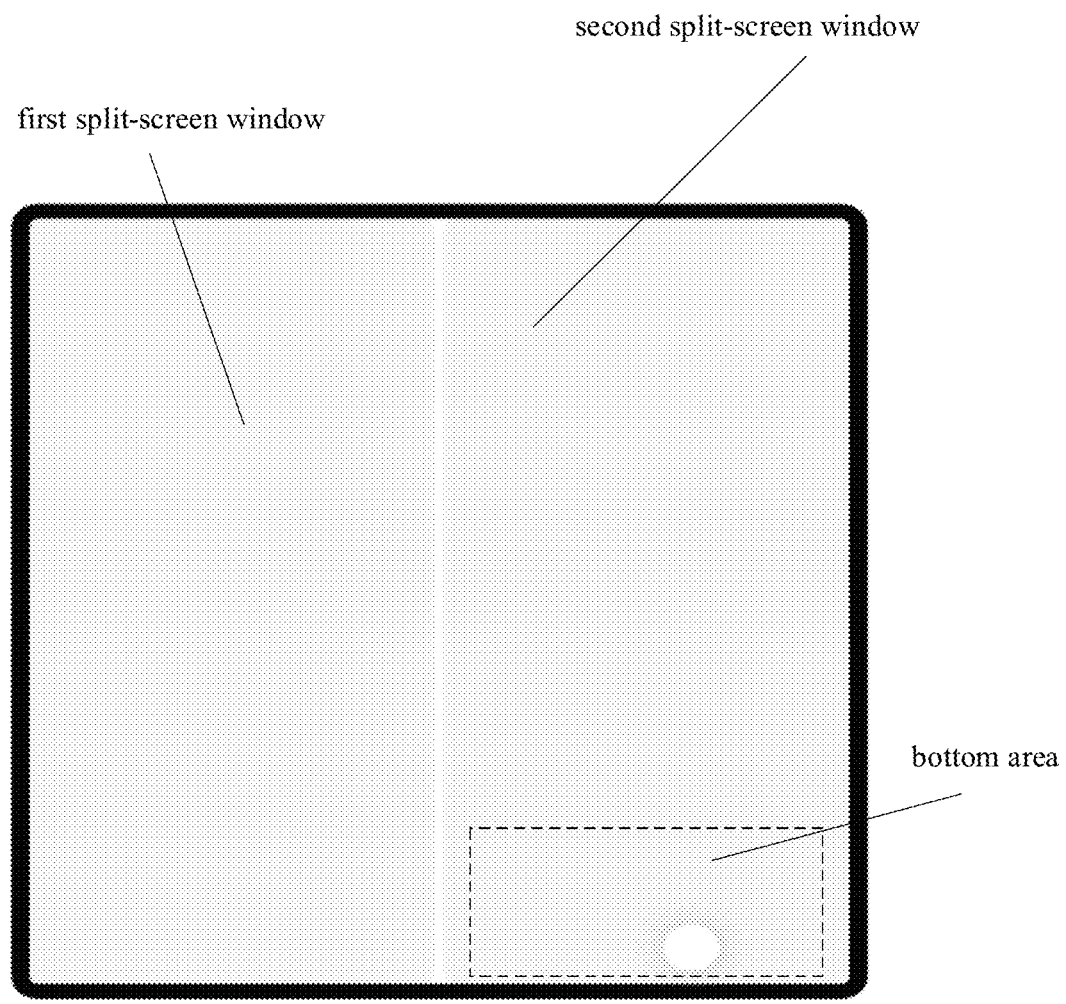
FIG. 6 is a schematic diagram illustrating a split-screen display according to an example embodiment.
Figure 7:
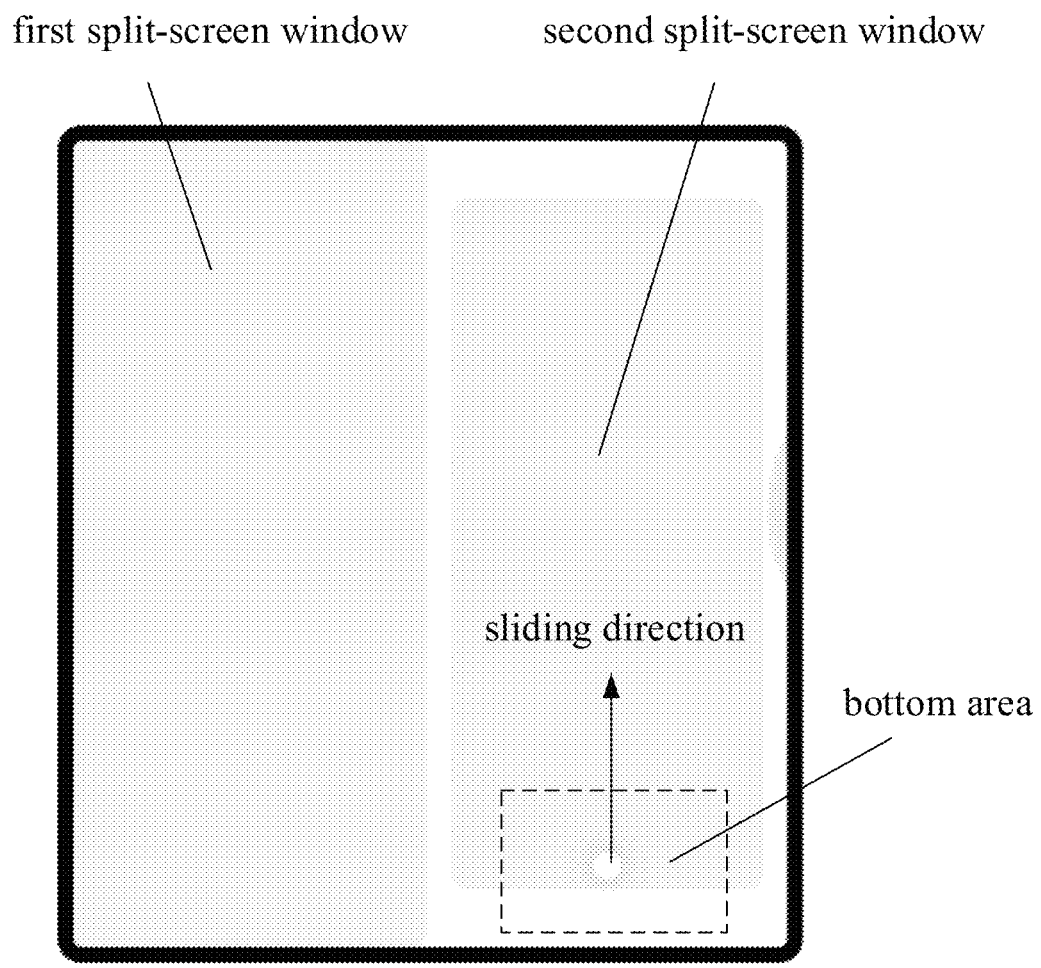
FIG. 7 is a schematic diagram illustrating a split-screen display according to another example embodiment.

For example, when the predetermined application is in a mode of multi-window left-right split-screen, the first split-screen window on the left is configured to display a list, and the second split-screen window on the right is configured to display a detailed content. In initial setting, the first split-screen window and the second split-screen window each occupies half of a display area of the electronic device. Referring to FIG. 6, if a user wants the first split-screen window to display more content, the user may trigger the adjustment of the size of the first split-screen window and the size of the second split-screen window by touching a bottom area of the second split-screen window with a gesture. For example, referring to FIG. 7, by sliding upward, a display size of the first split-screen window is increased, and a display size of the second split-screen window is reduced.

Similarly, if the user wants the second split-screen window to display more content, the user may trigger the adjustment of the size of the first split-screen window and the size of the second split-screen window by touching a bottom area of the first split-screen window with a gesture. For example, by sliding upward, a display size of the second split-screen window is increased, and a display size of the first split-screen window is reduced.

It should be noted that those skilled in the art can understand that the methods provided in the embodiments of the present disclosure can be implemented separately or together with some methods in the embodiments of the present disclosure or related technologies.

Figure 8:
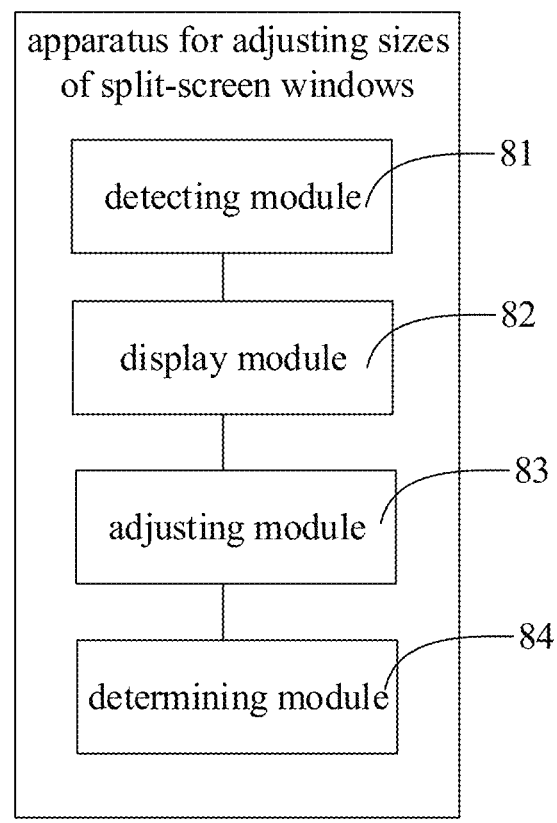
FIG. 8 is a schematic illustrating an apparatus for adjusting sizes of split-screen windows according to an example embodiment.

As illustrated in FIG. 8, an embodiment of the present disclosure provides an apparatus for adjusting sizes of split-screen windows, and the apparatus includes a detecting module 81, a display module 82 and an adjusting module 83.

The detecting module 81 is configured to detect a first operation on a first display widget, in response to a first split-screen window and a second split-screen window for a predetermined application being displayed in a display area.

The display module 82 is configured to display a second display widget, in response to the first operation being detected, in which the second display widget includes at least one icon and the at least one icon indicates a ratio of a size of the first split-screen window to a size of the second split-screen window.

The detecting module 81 is further configured to detect a second operation on the at least one icon.

The adjusting module 83 is configured to adjust the size of the first split-screen window and the size of the second split-screen window based on the ratio indicated by the at least one icon, in response to the second operation being detected.

In one embodiment, the apparatus further includes a determining module 84 configured to determine that the first operation is detected, in response to determining that a duration of an operation on the first display widget is greater than a duration threshold.

In one embodiment, the display module 82 is further configured to display the first display widget between the display area of the first split-screen window and the display area of the second split-screen window; or display the first display widget on an edge of the display area of the first split-screen window and/or an edge of the display area of the second split-screen window.

In one embodiment, the display module 82 is further configured to display the second display widget between the display area of the first split-screen window and the display area of the second split-screen window; or display the second display widget on an edge of the display area of the first split-screen window and/or an edge of the display area of the second split-screen window.

In one embodiment, the detecting module 81 is configured to detect a third operation in a predetermined area of the first split-screen window or the second split-screen window, in which the third operation is a sliding operation in a predetermined direction. The adjusting module 83 is configured to adjust the size of the first split-screen window and the size of the second split-screen window based on sliding amplitude and/or the predetermined direction of the third operation, in response to determining that the third operation is detected.

It should be noted that those skilled in the art can understand that the methods provided in the embodiments of the present disclosure can be implemented separately or together with some methods in the embodiments of the present disclosure or related technologies.

With regard to the apparatus in the embodiments, the specific way in which each module performs an operation has been described in detail in the embodiments of the method and will not be elaborated here.

An electronic device is provided in the embodiment of the disclosure, and includes: a memory; and a processor, which is connected with the memory respectively, configured to execute the steps of the method provided in any of the aforementioned embodiments.

The memory may include various types of storage media, which are non-transitory computer storage media and may continue to store information on a communication device after it is powered down.

The processor may be connected to the memory, for example, via a bus, for reading executable programs stored on the memory, and the programs may be executed by the processor to implement, for example, at least one of the methods shown in any of the embodiments.

A non-transitory computer-readable storage medium is provided in the embodiment of the disclosure, the non-transitory computer-readable storage medium has stored with a computer program therein that, when executed by a processor of a mobile terminal, causes the mobile terminal to perform a method for adjusting sizes of split-screen windows, for example, at least one of the methods illustrated in any embodiment of the present disclosure.

With regard to the apparatus in the embodiments, the specific way in which each module performs an operation has been described in detail in the embodiments of the method and will not be elaborated here.

Figure 9:
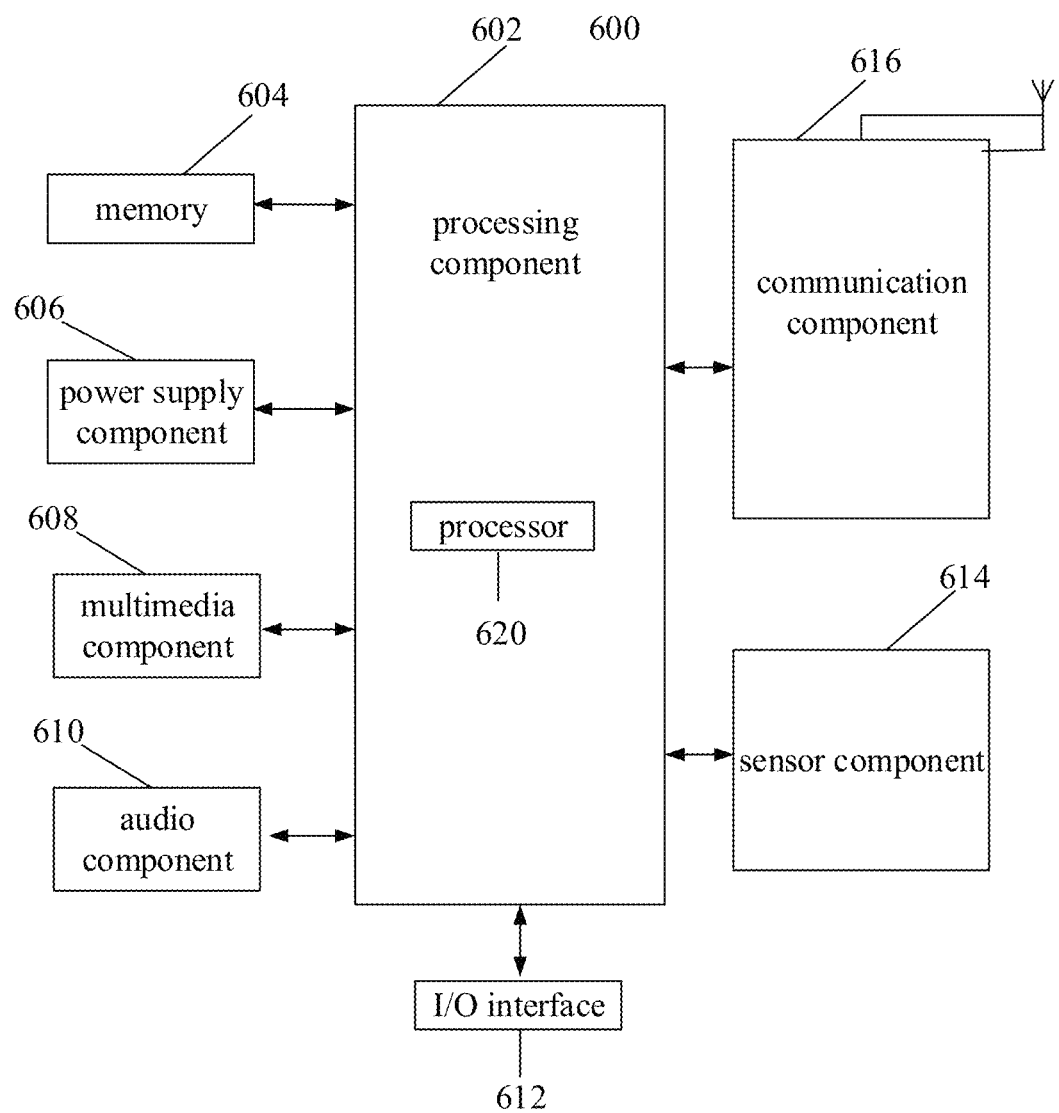
FIG. 9 is a block diagram illustrating an electronic device according to an example embodiment.

FIG. 9 is a block diagram illustrating an electronic device 600 according to an example embodiment. The methods of the present disclosure may be applied to the electronic device.

As illustrated in FIG. 9, the electronic device 600 may include one or more components: a processing component 602, a memory 604, a power supply component 606, a multimedia component 608, an audio component 610, an input/output (I/O) interface 612, a sensor component 614 and a communication component 616.

The processing component 602 generally control the overall operation of the electronic device 600, such as the operations associated with display, phone call, data communication, camera operations and recording operations. The processing component 602 may include one or more processors 620 to execute instructions to perform all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store all types of data to support the operation of the electronic device 600. Examples of the data include the instructions of any applications or methods operated on the electronic device 600, contact data, phone book data, messages, pictures, videos, etc. The memory 604 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 606 may provide power for all components of the electronic device 600. The power supply component 606 may include a power management system, one or more power sources, and other components associated with the generation, management and distribution of power in the electronic device 600.

The multimedia component 608 includes a screen providing an output interface between the electronic device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides and gestures on the touch panel. The touch sensors may not only sense a boundary of a touch or slide action, but also sense a period of time and a pressure associated with the touch or slide action. In some embodiments, the multimedia component 608 include a front camera and/or a rear camera. When the electronic device 600 is in an operation mode, such as a shooting mode or a video mode, the front camera and/or the rear camera may receive external multimedia data. Each of the front camera and the rear camera may be a fixed optical lens system or an optical lens system with focal length and optical zoom capacity.

The audio component 610 is configured to output and/or input an audio signal. For example, the audio component 610 includes a microphone (MIC). When the electronic device 600 is in an operation mode, such as a call mode, a recording mode and a voice recognition mode, the microphone is configured to receive external audio signals. The audio signals received may be further stored in the memory 604 or sent via the communication component 616. In some embodiments, the audio component 610 further includes a speaker configured to output an audio signal.

The I/O interface 612 provides an interface between the processing component 602 and a peripheral interface module, and the peripheral interface module may be a keyboard, a click wheel, a button, etc. The button may include, but is not limited to, a home button, a volume button, a start button and a lock button.

The sensor component 614 includes one or more sensors, configured to provide status assessment for various aspects of the electronic device 600. For example, the sensor component 614 may detect the on/off state of the electronic device 600, and the relative positioning of the components, for example, the components are a display and a keypad of the electronic device 600. The sensor component 614 may further detect the position change of the electronic device 600 or one component of the electronic device 600, the presence or absence of contact between the user and the electronic device 600, the orientation or acceleration/deceleration of the electronic device 600, and the temperature change of the electronic device 600. The sensor component 614 may include a proximity sensor, which is configured to detect the existence of nearby objects without any physical contact. The sensor component 614 may further include a light sensor such as a CMOS or CCD image sensor, for use in imaging applications. In some embodiments, the sensor component 614 may further include an acceleration sensor, a gyroscope sensor, a magnetic sensor, a pressure sensor or a temperature sensor.

The communication component 616 is configured to facilitate wired or wireless communication between the electronic device 600 and other devices. The electronic device 600 may access wireless networks based on a communication standard, such as WiFi, 2G or 3G, or their combination. In an illustrative embodiment, the communication component 616 receives broadcast signals or broadcast-related information from an external broadcast management system via a broadcast channel. In one illustrative embodiment, the communication component 616 further includes a near field communication (NFC) module to facilitate short-range communications. For example, the NFC module may be achieved based on a radio frequency identification (RFID) technology, an infrared data association (IrDA) technology, an ultra-wideband (UWB) technology, a Bluetooth (BT) technology and other technologies.

In an illustrative embodiment, the electronic device 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In an illustrative embodiment, there is also provided a non-transitory computer-readable storage medium including instructions, such as included in the memory 604, executable by the processor 620 of the electronic device 600, for performing the above method. For example, the non-transitory computer-readable storage medium may be a read-only memory (ROM), a random access memory (RAM), a compact disc read-only memory (CD-ROM), a magnetic tape, a floppy disc, an optical data storage device, and the like.

After considering the specification and practicing the disclosure herein, those skilled in the art will easily think of other embodiments of the disclosure. The disclosure is intended to cover any variations, usages, or adaptive changes of the present disclosure. These variations, usages, or adaptive changes follow the general principles of the disclosure and include common knowledge or conventional technical means in the technical field not disclosed in the present disclosure. The specification and embodiments are only illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for adjusting sizes of split-screen windows, applied to an electronic device, comprising:
   detecting a first operation on a first display widget, in response to a first split-screen window and a second split-screen window for an application being displayed in a display area;
   displaying a second display widget, in response to the first operation being detected, wherein the second display widget comprises at least one icon and the at least one icon indicates a ratio of a size of the first split-screen window to a size of the second split-screen window;
   detecting a second operation on the at least one icon;
   adjusting the size of the first split-screen window and the size of the second split-screen window based on the ratio indicated by the at least one icon, in response to the second operation being detected;
   displaying the first split-screen window and the second split-screen window for the application according to pre-configuration information, in response to the application being started; and
   determining that the first operation is detected, in response to determining that a duration of an operation on the first display widget is greater than a duration threshold; wherein, the duration threshold is determined based on a mistouch rate of a display screen of the electronic device; the duration threshold is less than a value, in response to the mistouch rate being less than a mistouch rate threshold; or, the duration threshold is greater than the value, in response to the mistouch rate being greater than the mistouch rate threshold;
   wherein by sliding upward on a bottom area of the second split-screen window, a display size of the first split-screen window is increased, and a display size of the second split-screen window is reduced when the first split-screen window and the second split-screen window of the application are displayed in a left-right layout.

2. The method of claim 1, further comprising:
   displaying the first display widget between a display area of the first split-screen window and a display area of the second split-screen window; or displaying the first display widget on at least one of an edge of the display area of the first split-screen window or an edge of the display area of the second split-screen window.

3. The method of claim 1, further comprising:
   displaying the second display widget between a display area of the first split-screen window and a display area of the second split-screen window, or displaying the second display widget on at least one of an edge of the display area of the first split-screen window or an edge of the display area of the second split-screen window.

4. The method of claim 1, wherein the method further comprises:
  displaying the first split-screen window in a first display area on the display screen of the electronic device, and displaying the second split-screen window in a second display area on the display screen of the electronic device, in response to the application being started.

5. The method of claim 1, wherein displaying the first split-screen window and the second split-screen window according to the pre-configuration information, in response to the application being started comprising:
  displaying the first split-screen window and the second split-screen window in the left-right layout, in response to the pre-configuration information indicating that configuration windows are configured in the left-right layout; or,
  displaying the first split-screen window and the second split-screen window in a top-bottom layout, in response to the pre-configuration information indicating that the configuration windows are configured in the top-bottom layout.

6. The method of claim 1, wherein the application is a single application run on the electronic device.

7. An electronic device, comprising:
  a processor; and
  a memory for storing instructions executable by the processor;
  wherein the processor is configured to:
  detect a first operation on a first display widget, in response to a first split-screen window and a second split-screen window for an application being displayed in a display area;
  display a second display widget, in response to the first operation being detected, wherein the second display widget comprises at least one icon and the at least one icon indicates a ratio of a size of the first split-screen window to a size of the second split-screen window;
  detect a second operation on the at least one icon;
  adjust the size of the first split-screen window and the size of the second split-screen window based on the ratio indicated by the at least one icon, in response to the second operation being detected;
  display the first split-screen window and the second split-screen window for the application according to pre-configuration information, in response to the application being started; and
  determine that the first operation is detected, in response to determining that a duration of an operation on the first display widget is greater than a duration threshold; wherein, the duration threshold is determined based on a mistouch rate of a display screen of the electronic device; the duration threshold is less than a value, in response to the mistouch rate being less than a mistouch rate threshold; or, the duration threshold is greater than the value, in response to the mistouch rate being greater than the mistouch rate threshold;
  wherein by sliding upward on a bottom area of the second split-screen window, a display size of the first split-screen window is increased, and a display size of the second split-screen window is reduced when the first split-screen window and the second split-screen window of the application are displayed in a left-right layout.

8. The electronic device of claim 7, wherein the processor is configured to:
  display the first display widget between a display area of the first split-screen window and a display area of the second split-screen window; or, display the first display widget on at least one of an edge of the display area of the first split-screen window or an edge of the display area of the second split-screen window.

9. The electronic device of claim 7, wherein the processor is configured to:
  display the second display widget between a display area of the first split-screen window and a display area of the second split-screen window, or, display the second display widget on at least one of an edge of the display area of the first split-screen window or an edge of the display area of the second split-screen window.

10. The electronic device of claim 7, wherein the processor is further configured to:
  detect a third operation in a predetermined area of the first split-screen window or the second split-screen window, wherein the third operation is a sliding operation in a predetermined direction; and
  adjust the size of the first split-screen window and the size of the second split-screen window based on at least one of sliding amplitude or the predetermined direction of the third operation, in response to determining that the third operation is detected.

11. The electronic device of claim 7, wherein the processor is further configured to:
  display the first split-screen window in a first display area on the display screen of the electronic device, and displaying the second split-screen window in a second display area on the display screen of the electronic device, in response to the application being started.

12. The electronic device of claim 7, wherein the processor is configured to:
  display the first split-screen window and the second split-screen window in the left-right layout, in response to the pre-configuration information indicating that configuration windows are configured in the left-right layout; or,
  display the first split-screen window and the second split-screen window are in a top-bottom layout, in response to the pre-configuration information indicating that the configuration windows are configured in the top-bottom layout.

13. A non-transitory computer-readable storage medium having stored therein instructions that, when executed by a processor of a mobile terminal, causes the mobile terminal to perform a method for adjusting sizes of split-screen windows, the method comprising:
  detecting a first operation on a first display widget, in response to a first split-screen window and a second split-screen window for an application being displayed in a display area;
  displaying a second display widget, in response to the first operation being detected, wherein the second display widget comprises at least one icon and the at least one icon indicates a ratio of a size of the first split-screen window to a size of the second split-screen window;
  detecting a second operation on the at least one icon; and
  adjusting the size of the first split-screen window and the size of the second split-screen window based on the ratio indicated by the at least one icon, in response to the second operation being detected;
  displaying the first split-screen window and the second split-screen window for the application according to pre-configuration information, in response to the application being started; and
  determining that the first operation is detected, in response to determining that a duration of an operation on the first display widget is greater than a duration threshold; wherein, the duration threshold is determined based on a mistouch rate of a display screen of the electronic device; the duration threshold is less than a value, in response to the mistouch rate being less than a mistouch rate threshold; or, the duration threshold is greater than the value, in response to the mistouch rate being greater than the mistouch rate threshold;

wherein by sliding upward on a bottom area of the second split-screen window, a display size of the first split-screen window is increased, and a display size of the second split-screen window is reduced when the first split-screen window and the second split-screen window of the application are displayed in a left-right layout.

\* \* \* \* \*